(12) United States Patent
Packer et al.

(10) Patent No.: US 11,162,432 B2
(45) Date of Patent: Nov. 2, 2021

(54) INTEGRATED NOZZLE AND DIAPHRAGM WITH OPTIMIZED INTERNAL VANE THICKNESS

(71) Applicant: General Electric Company, Schenectady, NY (US)

(72) Inventors: Travis J Packer, Lebanon, OH (US); Brad Wilson VanTassel, Greer, SC (US); William Scott Zemitis, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 132 days.

(21) Appl. No.: 16/575,785

(22) Filed: Sep. 19, 2019

(65) Prior Publication Data
US 2021/0087979 A1   Mar. 25, 2021

(51) Int. Cl.
*F01D 9/06* (2006.01)
*F02C 9/22* (2006.01)
*F01D 5/18* (2006.01)

(52) U.S. Cl.
CPC .......... *F02C 9/22* (2013.01); *F01D 5/189* (2013.01); *F01D 9/065* (2013.01); *F05D 2220/32* (2013.01); *F05D 2240/128* (2013.01); *F05D 2250/90* (2013.01); *F05D 2260/201* (2013.01)

(58) Field of Classification Search
CPC ..... F05D 2260/201; F01D 9/065; F01D 5/189
See application file for complete search history.

(56) References Cited

U.S. PATENT DOCUMENTS

| 4,183,716 A * | 1/1980 | Takahara ............... F01D 5/189 415/115 |
| 4,529,357 A | 7/1985 | Holland |
| 6,142,734 A | 11/2000 | Lee |
| 6,264,428 B1 * | 7/2001 | Dailey ................... F01D 5/187 416/97 R |
| 6,325,593 B1 * | 12/2001 | Darkins, Jr. ........... F01D 5/189 415/115 |
| 6,428,270 B1 | 8/2002 | Leone et al. |
| 6,572,335 B2 | 6/2003 | Kuwabara et al. |
| 8,257,035 B2 | 9/2012 | Schilp |
| 9,470,095 B2 | 10/2016 | Propheter-Hinckley et al. |
| 9,777,581 B2 * | 10/2017 | Nilsson ................. F01D 5/189 |
| 9,863,254 B2 | 1/2018 | Cegilo et al. |
| 2016/0146018 A1 | 5/2016 | Metternich et al. |
| 2017/0204734 A1 | 7/2017 | Groves, II et al. |
| 2017/0268345 A1 | 9/2017 | Groves, II et al. |
| 2018/0023398 A1 | 1/2018 | Jones et al. |

OTHER PUBLICATIONS

International Search Report and Written Opinion dated Nov. 19, 2020 for PCT/US2020/049896 filed Sep. 9, 2020; pp. 19.

* cited by examiner

*Primary Examiner* — Eldon T Brockman
(74) *Attorney, Agent, or Firm* — James Pemrick; Hoffman Warnick LLC (57) ABSTRACT

A vane of a turbine system is provided. The vane includes: an internal cavity configured to receive a flow of cooling fluid; a variable thickness wall adjacent the internal cavity; and an impingement plate separating the variable thickness wall from the internal cavity, the impingement plate including a plurality of apertures for directing the cooling fluid into an impingement cavity and against the variable thickness wall, wherein the impingement plate is configured to follow a contour of the variable thickness wall.

15 Claims, 9 Drawing Sheets

INTEGRATED NOZZLE AND DIAPHRAGM WITH OPTIMIZED INTERNAL VANE THICKNESS

BACKGROUND

The disclosure relates generally to gas turbine systems, and more particularly, to an integrated nozzle and diaphragm with optimized internal vane thickness.

Gas turbine systems are one example of turbomachines widely utilized in fields such as power generation. A conventional gas turbine system generally includes a compressor section, a combustor section, and a turbine section. During operation of a gas turbine system, various components in the gas turbine system, such as nozzle vanes, and turbine blades, and shroud segments are subjected to high temperature gas flows and associated thermal-mechanical forces, which can cause the components to fail.

SUMMARY

A first embodiment is directed to a vane of a turbine system. The vane includes: an internal cavity configured to receive a flow of cooling fluid; a variable thickness wall adjacent the internal cavity; and an impingement plate separating the variable thickness wall from the internal cavity, the impingement plate including a plurality of apertures for directing the cooling fluid into an impingement cavity and against the variable thickness wall, wherein the impingement plate is configured to follow a contour of the variable thickness wall.

Another embodiment provides a nozzle segment for a gas turbine system. The nozzle segment including: an integrated nozzle and diaphragm, the nozzle including at least one vane, each vane including: an internal cavity configured to receive a flow of cooling fluid; a variable thickness wall adjacent the internal cavity; and an impingement plate separating the variable thickness wall from the internal cavity, the impingement plate including a plurality of apertures for directing the cooling fluid into an impingement cavity and against the variable thickness wall, wherein the impingement plate is configured to follow a contour of the variable thickness wall.

A further embodiment is directed to a method for optimizing a vane of a gas turbine system, the method including: determining operational forces on the vane; and varying a thickness of a wall of the vane based on the operational forces on the vane; wherein the thickness of the wall is greater in areas of higher operational forces on the vane.

The illustrative aspects of the present disclosure solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

Reference will now be made in detail to representative embodiments illustrated in the accompanying drawings. It should be understood that the following descriptions are not intended to limit the embodiments to one embodiment. To the contrary, it is intended to cover alternatives, modifications, and equivalents as can be included within the spirit and scope of the described embodiments as defined by the appended claims.

As an initial matter, in order to clearly describe the current disclosure, it will become necessary to select certain terminology when referring to and describing relevant machine components within the scope of this disclosure. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine. Additionally, the terms "leading" and "trailing" may be used and/or understood as being similar in description as the terms "forward" and "aft," respectively. It is often required to describe parts that are at differing radial, axial and/or circumferential positions. The "A" axis represents an axial orientation. As used herein, the terms "axial" and/or "axially" refer to the relative position/direction of objects along axis A, which is substantially parallel with the axis of rotation of the gas turbine system (in particular, the rotor section). As further used herein, the terms "radial" and/or "radially" refer to the relative position/direction of objects along a direction "R" (see, FIG. 1), which is substantially perpendicular with axis A and intersects axis A at only one location. Finally, the term "circumferential" refers to movement or position around axis A (e.g., direction "C").

In various embodiments, components described as being "fluidly coupled" to or "in fluid communication" with one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding).

When an element or layer is referred to as being "on", "engaged to", "connected to" or "coupled to" another element, it may be directly on, engaged, connected or coupled to the other element, or intervening elements may be present. In contrast, when an element is referred to as being "directly on," "directly engaged to", "directly connected to" or "directly coupled to" another element, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Figure 1:
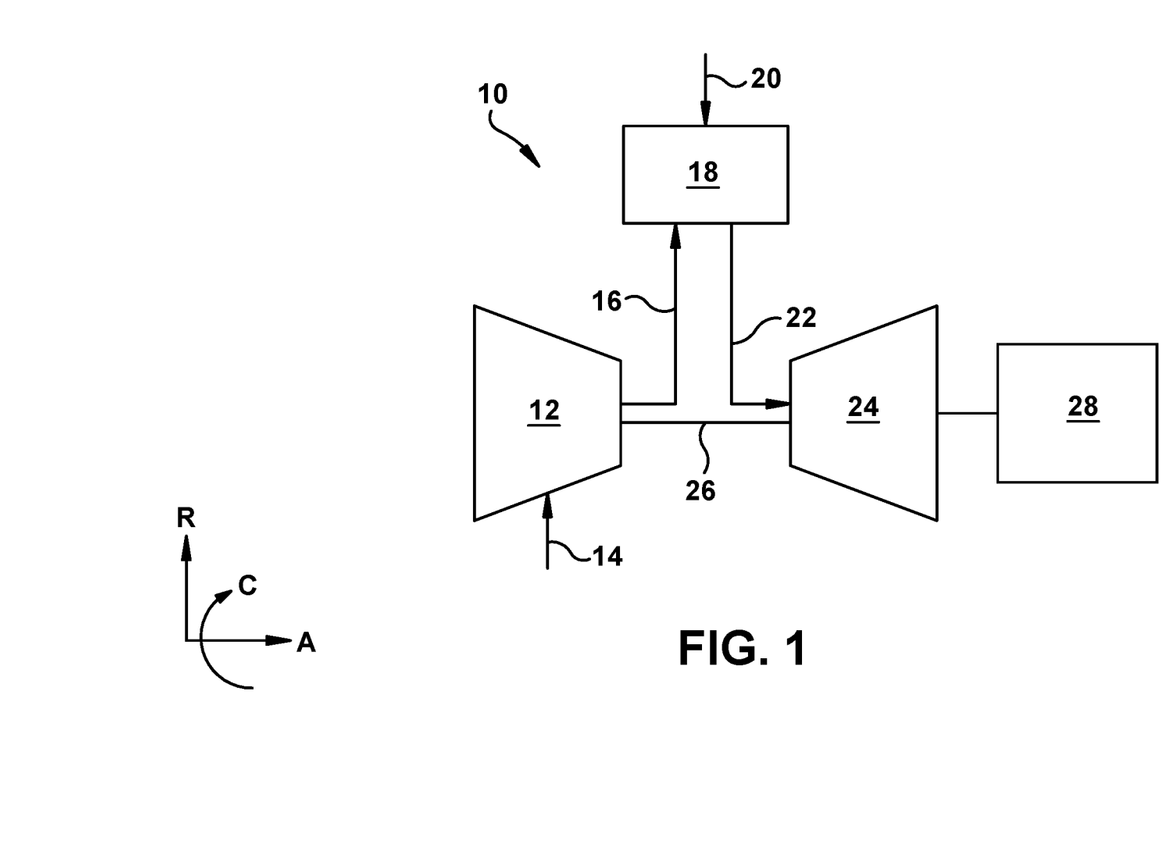
FIG. 1 depicts a schematic diagram of a gas turbine system according to embodiments.

FIG. 1 depicts a schematic diagram of a gas turbine system 10 according to various embodiments. As shown, the gas turbine system 10 includes a compressor section 12 for compressing an incoming flow of air 14 and for delivering a flow of compressed air 16 to a combustor section 18. The combustor section 18 mixes the flow of compressed air 16 with a pressurized supply of fuel 20 and ignites the mixture to create a flow of combustion gases 22. Although only a single combustor section 18 is shown, the gas turbine system 10 may include any number of combustor sections 18. The flow of combustion gases 22 is in turn delivered to a turbine section 24. The flow of combustion gases 22 drives the turbine section 24 to produce mechanical work. The mechanical work produced in the turbine section 24 may drive the compressor section 12 via a shaft 26 and may be used to drive an external load 28, such as an electrical generator and/or the like.

Figure 2:
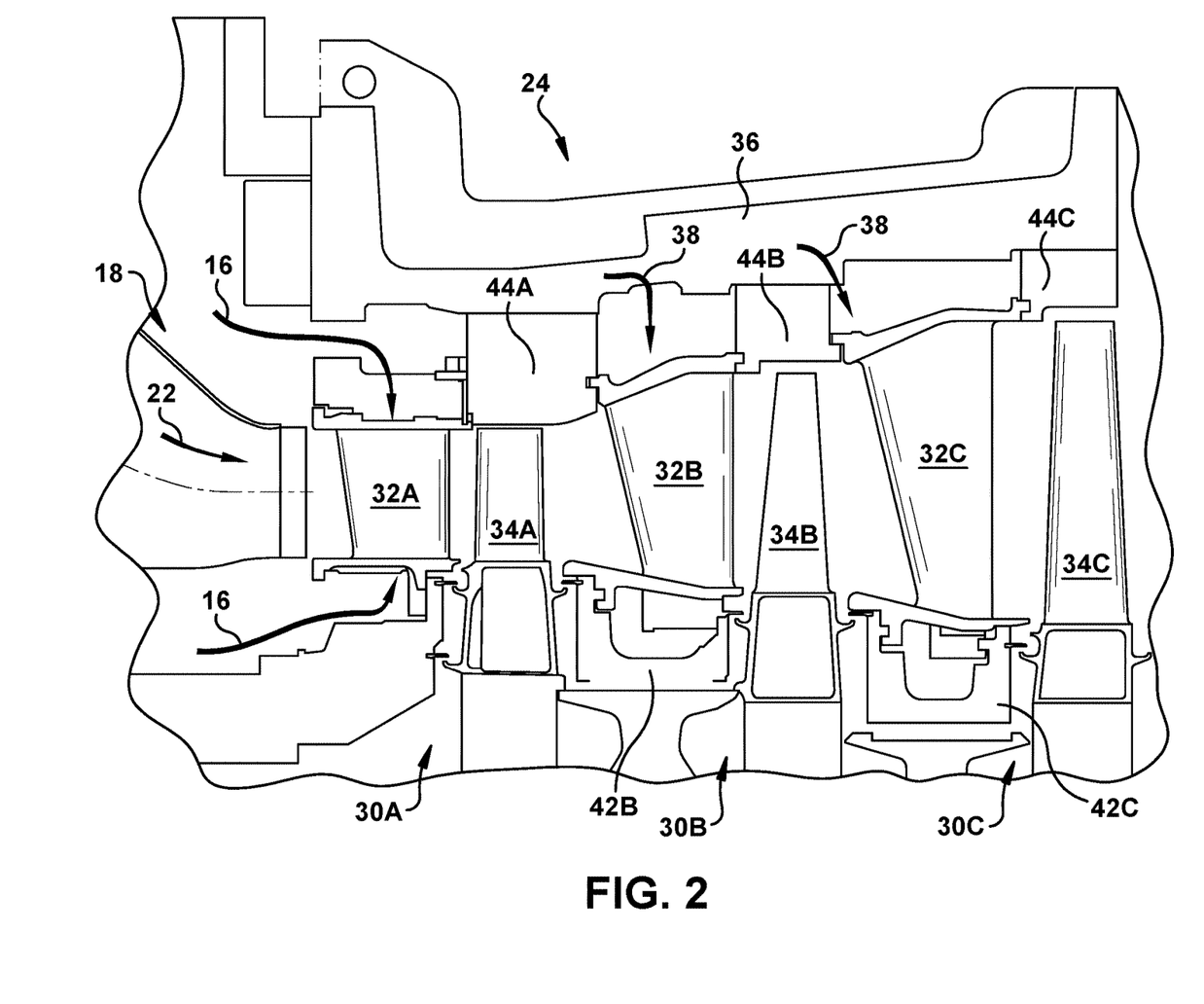
FIG. 2 depicts a side view of a portion of a turbine section of a gas turbine system according to embodiments.

FIG. 2 is a cross-sectional side view of a portion of a turbine section 24 of a gas turbine system 10 that may incorporate various embodiments disclosed herein. As shown in FIG. 2, the turbine section 24 may include multiple turbine stages. For example, the turbine section 24 may include a first turbine stage 30A, a second turbine stage 30B, and a third turbine stage 30C. However, the turbine section 24 may include more or less turbine stages as is necessary or desired.

Each turbine stage 30A-30C may include, in serial flow order, a corresponding row of turbine nozzles (hereafter "nozzles") 32A, 32B, and 32C and a corresponding row of turbine blades (hereafter "blades") 34A, 34B, and 34C axially spaced apart along the shaft 26 (FIG. 1). Each of the nozzles 32A-32C remains stationary relative to the blades 34A-34C during operation of the gas turbine system 10. Each of the rows of nozzles 32B, 32C is respectively coupled to or formed integrally with a corresponding diaphragm 42B, 42C. Turbine shroud 44A, turbine shroud 44B, and turbine shroud 44C circumferentially enclose the corresponding row of blades 34A-34C. A casing or shell 36 circumferentially surrounds each stage 30A-30C of the nozzles 32A-32C and blades 34A-34C.

The nozzles 32A-32C and blades 34A-34C extract kinetic and/or thermal energy from the combustion gases 22. This energy extraction drives the shaft 26. The combustion gases 22 then exit the turbine section 24 and the gas turbine system 10. As will be discussed in greater detail below, a portion of the compressed air 16 may be used as a cooling fluid for cooling the various components of the turbine section 24 including, inter alia, the nozzles 32A-32C and blades 34A-34C.

Figure 3:
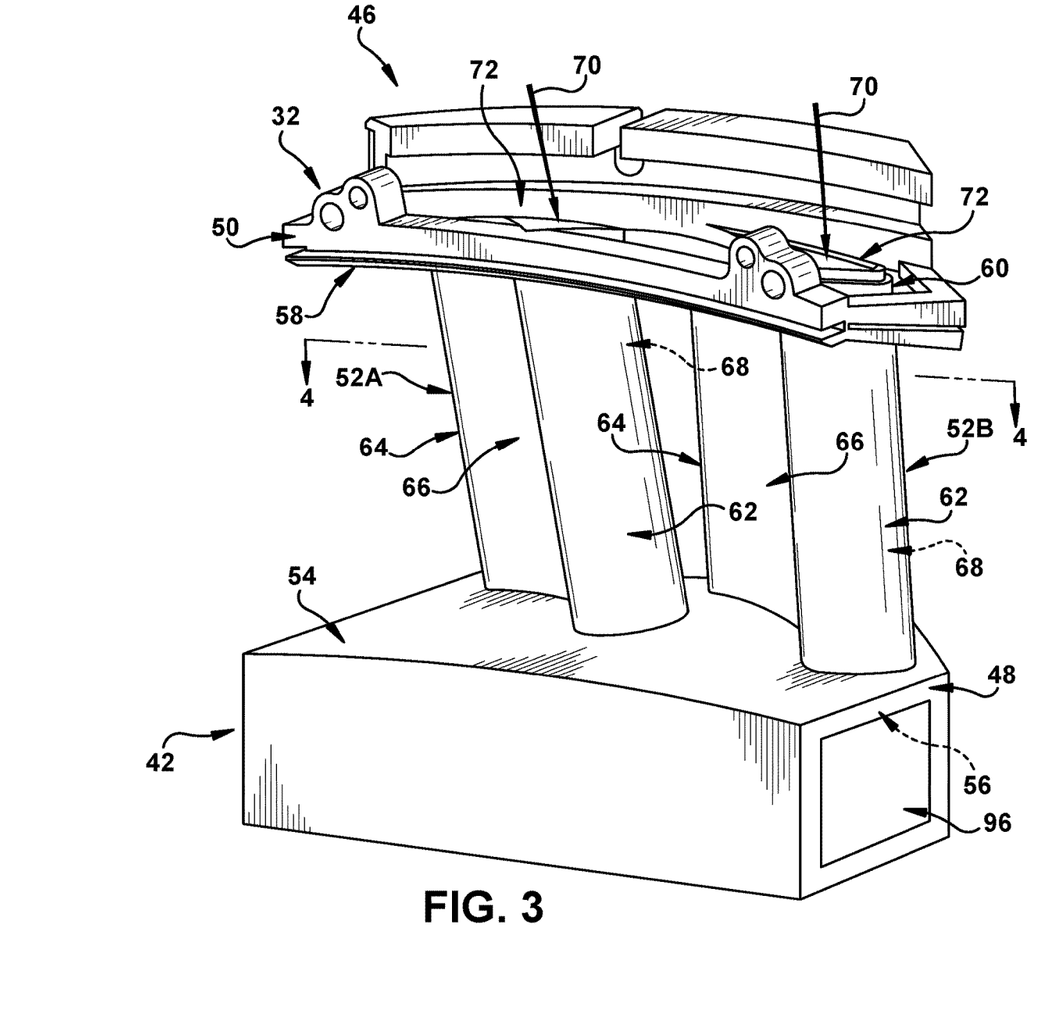
FIG. 3 depicts an isometric view of a nozzle segment including a nozzle with an integrated diaphragm according to embodiments.

FIG. 3 is an isometric view of a nozzle segment 46 including an integrated nozzle 32 and diaphragm 42 according to embodiments. The nozzle 32 and diaphragm 42 may be formed as a single unit using, for example, an additive manufacturing process. As shown in FIG. 3, the nozzle 32 may include an inner side wall 48 (which also forms an upper wall of the diaphragm 42) and an outer side wall 50 radially spaced apart from the inner side wall 48. The nozzle 32 may include a pair of vanes 52 that extend in span from the inner side wall 48 to the outer side wall 50. This nozzle configuration is commonly referred to in the industry as a doublet. However, the nozzle 32 may have only one vane 52 (i.e., a singlet) or three (i.e., a triplet) or more vanes 52.

As illustrated in FIG. 3, the inner and the outer side walls 48, 50 of the nozzle 32 include various surfaces. More specifically, the inner side wall 48 includes a radially outer surface 54 and a radially inner surface 56 positioned radially inwardly from the radially outer surface 54. Similarly, the outer side wall 50 includes a radially inner surface 58 and a radially outer surface 60 oriented radially outwardly from the radially inner surface 58. The radially inner surface 58 of the outer side wall 50 and the radially outer surface 54 of the inner side wall 48 respectively define inner and outer radial flow boundaries for the combustion gases 22 flowing through the turbine section 24 (FIG. 1).

As mentioned above, two vanes 52A, 52B (generally referred to herein as vanes 52) extend from the inner side wall 48 to the outer side wall 50 of the nozzle 32. As illustrated in FIG. 3, the body of each vane 52 includes a leading edge 62, a trailing edge 64, a pressure side wall 66, and an opposing suction side wall 68 extending from the leading edge 62 to the trailing edge 64.

A cooling fluid, such as pressurized cooling air 70 bled off from the compressor section 12 of the turbine system 10 (FIG. 1), may be routed into one or more internal cavities 72 formed within each vane 52. The cooling air 70 may be used to cool (e.g., through impingement cooling, convection cooling, film cooling, etc.) various internal and external portions of the vane 52.

Various portions of a vane 52 of a nozzle 32, including the leading edge 62 and what is known in the art as the high-c area, may be subject to high temperatures and high mechanical forces during operation of the turbine system 10 (FIG. 1), which can lead to a reduction in the operational lifetime of the nozzle 32. According to embodiments, the operational lifetime of the nozzle 32 may be increased, for example, by preferentially varying the thicknesses of various portions of the vanes 52 (e.g., thicker in regions subject to higher forces, thinner in regions subject to lower forces) and by providing a contour-following impingement plate 76 (FIG. 4) within the vanes 52.

Figure 4:
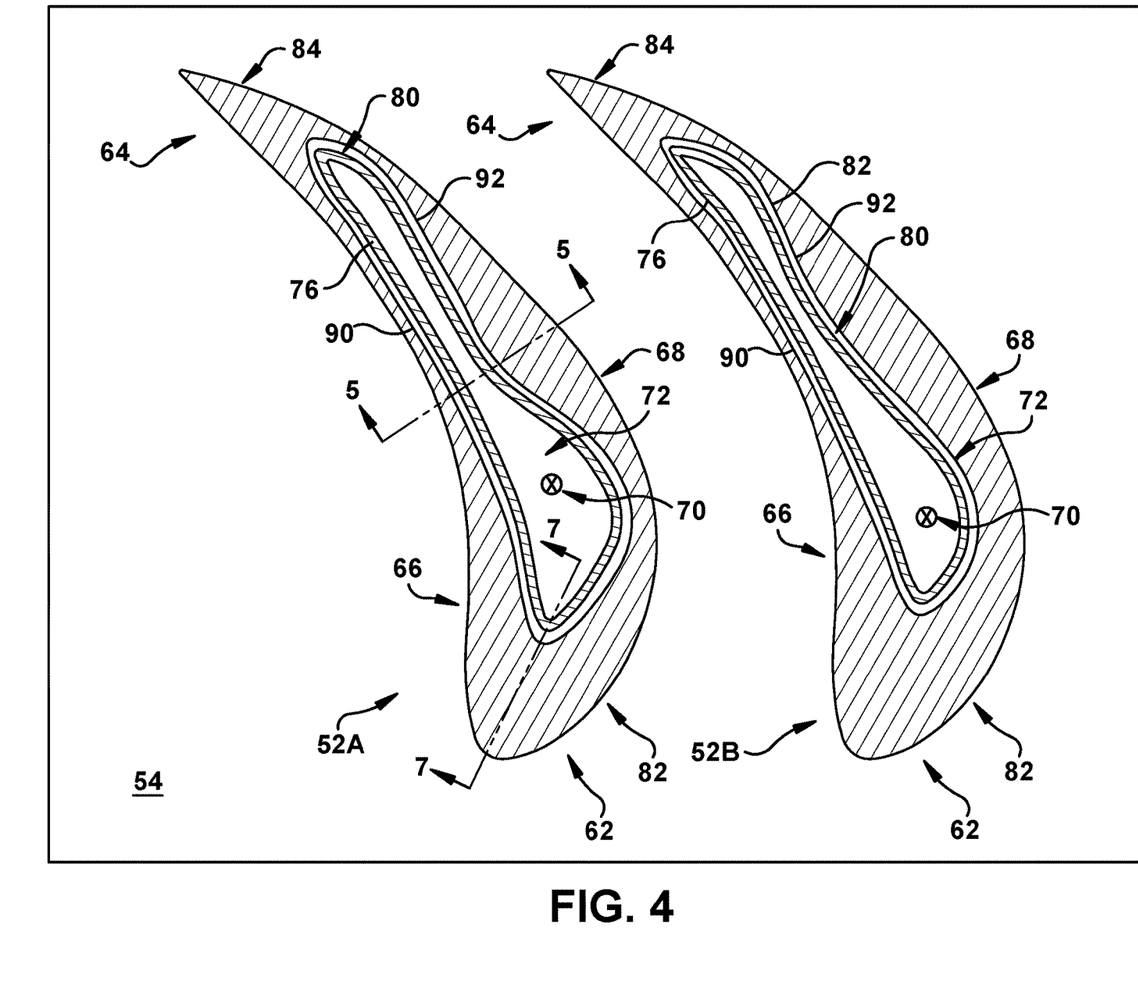
FIG. 4 depicts a cross-sectional view of the nozzle vanes taken along line 4-4 in FIG. 3 according to embodiments.

FIG. 4 depicts a cross-sectional view of the vanes 52A, 52B of the nozzle 32 taken along line 4-4 in FIG. 3. As shown, each vane 52A, 52B includes at least one internal cavity 72 configured to receive a flow of cooling air 70. Cooling air 70 is shown as flowing radially downward (i.e., into the page) into the cavities 72, although other flow directions may be used. The internal cavities 72 of the vanes 52A, 52B may have different configurations as shown (e.g., the wall thicknesses of the vanes 52A, 52B may be different) or may have a similar configuration. In the non-limiting example shown in FIG. 4, the flow of cooling air 70 is directed radially downward into the internal cavities 72 toward the diaphragm 42 (FIG. 3).

The impingement plate 76 may extend continuously about the internal cavity 72 as shown, or may include a plurality of separate impingement plate sections. In general, the impingement plate 76 directs cooling aft 70 from the internal cavity 72 of each vane 52, through a plurality of apertures 78 (FIG. 5) formed through the impingement plate 76, into an impingement cavity 80. After entering the cavity 80, the cooling aft 70 impinges against various interior wall(s) of the vane 52 (e.g., pressure side wall 66 and suction side wall 68 of the vane 52), providing impingement cooling. The cooling aft 70 may be directed from the cavity 80 to other internal/external portions of the vane 52 to provide additional cooling to the vane 52.

Figure 5:
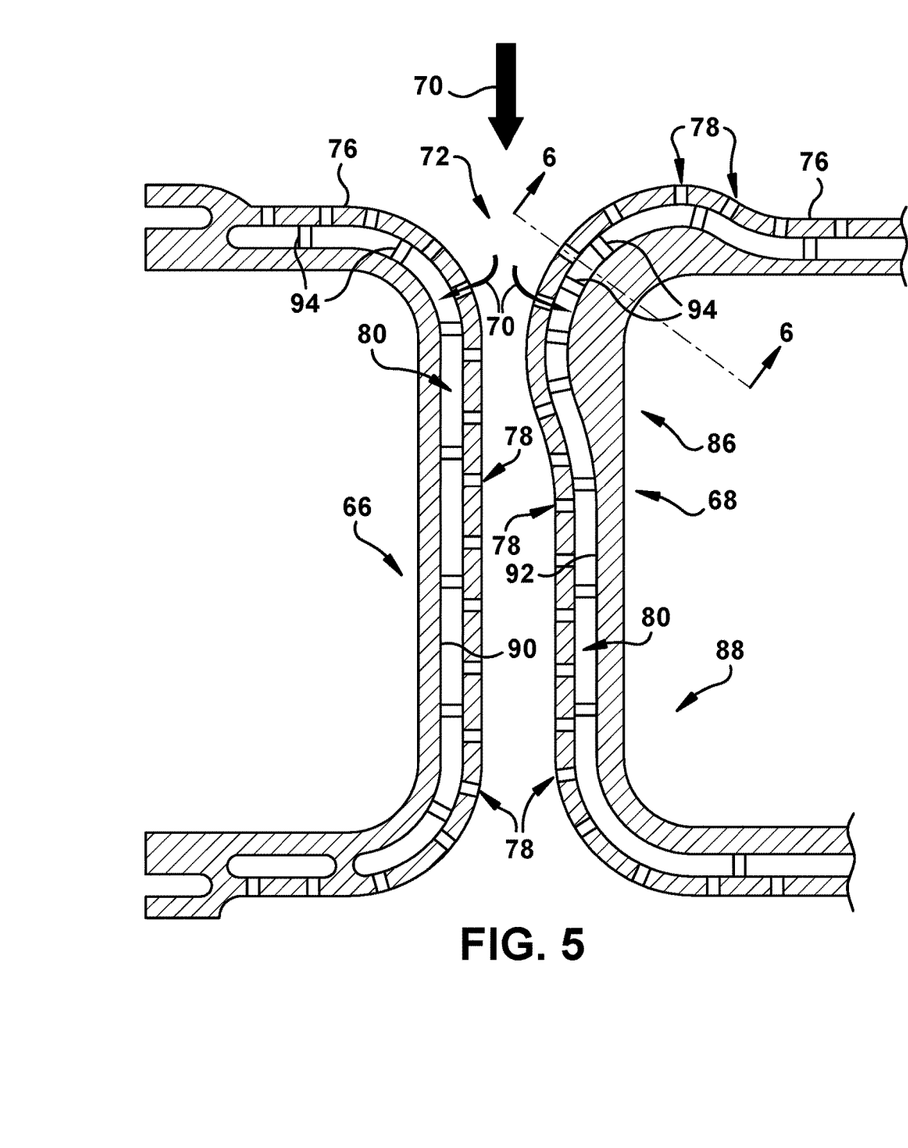
FIG. 5 depicts a cross-sectional view of a portion of a nozzle vane taken along line 5-5 in FIG. 4 according to embodiments.

The thicknesses of one or more portions of the vane 52 (e.g., pressure side wall 66, suction side wall 68, leading edge wall 82, trailing edge wall 84, etc.) may be preferentially varied in accordance with expected (or estimated) operational forces. The operational forces on the vane 52 may be determined, for example, via computer modeling, physical testing, or other suitable analysis techniques. This may include, for example, modeling and analyzing the operational forces using an engineering simulation tool, modifying one or more of the thicknesses, and rerunning the analysis. In FIG. 5, for example, the pressure side wall 66 of the vane 52 has been formed with a substantially uniform thickness, since operational forces are expected to be relatively uniform along the length of the pressure side wall 66. However, a radially outward portion 86 of the suction side wall 68 (e.g., in the hi-c region) is formed with a thickness greater than that of a radially inward portion 88 of the suction side wall 68, since operational forces are expected to be greater at the radially outward portion 86 of the suction side wall 68. In general, the thicknesses of one or more portions of the vane 52 is proportional to expected operational forces. For example, according to embodiments, the thickness of the suction side wall 68 in the hi-c area (e.g., see FIG. 5) may be on the order of about 1.1 to about 1.5 times the nominal wall thickness (e.g., the thickness of the pressure-side wall 66) of the vane 52. In general, depending on expected operational forces, the wall thickness of portions of the walls of the vane 52 may be in the range of 1.1 to 2.5× the nominal wall thickness of the vane 52.

Figure 6:
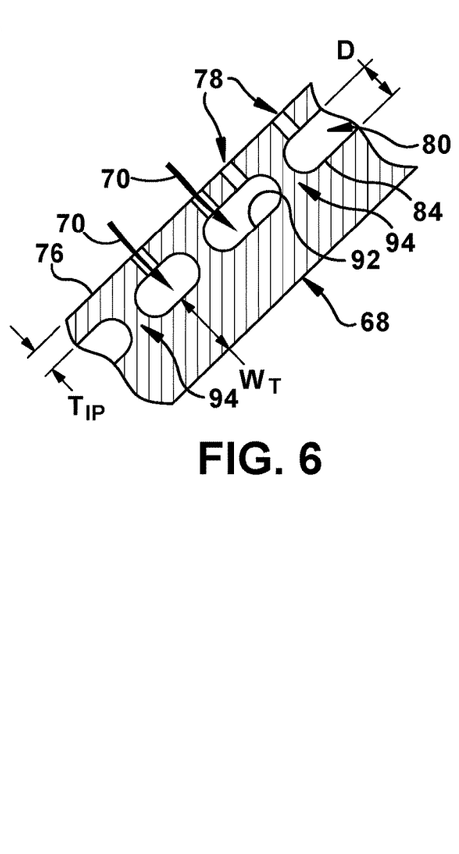
FIG. 6 depicts a cross-sectional view of a portion of a nozzle vane taken along line 6-6 in FIG. 5 according to embodiments.

According to embodiments, the impingement plate 76 is configured to follow the contours of the interior walls of the vane 52. For example, as shown in AGS. 5 and 6, the impingement plate 76 is configured to follow the contours of the inner side walls 90, 92 of the pressure and suction side walls 66, 68 of the vane 52. Advantageously, by following the contours of the interior walls of the vane 52, the distance D between the impingement plate 76 and the interior walls of the vane 52 (and the impingement cooling provided via the impingement plate 76) can be more accurately controlled (e.g., as compared to impingement plate inserts). The distance D may be substantially constant throughout the vane 52 or may be variable (e.g., to selectively adjust the resultant impingement cooling).

A set of support beams 94 may be provided to connect and separate the impingement plate 76 to/from the inner side walls 90, 92 of the pressure and suction side walls 66, 68. The support beams 94 provide several functions. For example, the support beams 94 connect the impingement plate provide structural support/stiffness for the pressure and suction side walls 66, 68, allowing the pressure and suction side walls 66, 68 of the vane 52 to be made thinner. Further, the support beams 94 maintain and control the distance between the impingement plate 76 and the inner side walls 90, 92 of the pressure and suction side walls 66, 68. With thinner walls, the cooling air 70 can more effectively cool the hot side of a vane 52. For example, instead of having the vane 52 be 0.2" thick, it can be made 0.1" thick and the impingement plate 76 can be made 0.1" thick. The resulting structure has a similar stiffness, but a better cooling effectiveness. Thus, the amount of cooling aft 70 needed to cool the structure is reduced and the life of the structure may be extended. This also provides the ability to tune specific locations to be thinner or thicker than the average to address stress and oxidation concerns.

According to embodiments, the impingement plate 76 may have a uniform thickness $T_{IP}$ (FIG. 6) throughout the vane 52. Alternatively, the thickness $T_{IP}$ of the impingement plate 76 may vary within the vane 52. For example, the thickness $T_{IP}$ of the impingement plate 76 may be inversely proportional to a thickness $T_w$ (FIG. 6) of an adjacent interior wall section. As such, the impingement plate 76 may be thicker adjacent a thinner interior wall section (e.g., to provide additional structural support) and thinner adjacent a thicker interior wall section.

Figure 7:
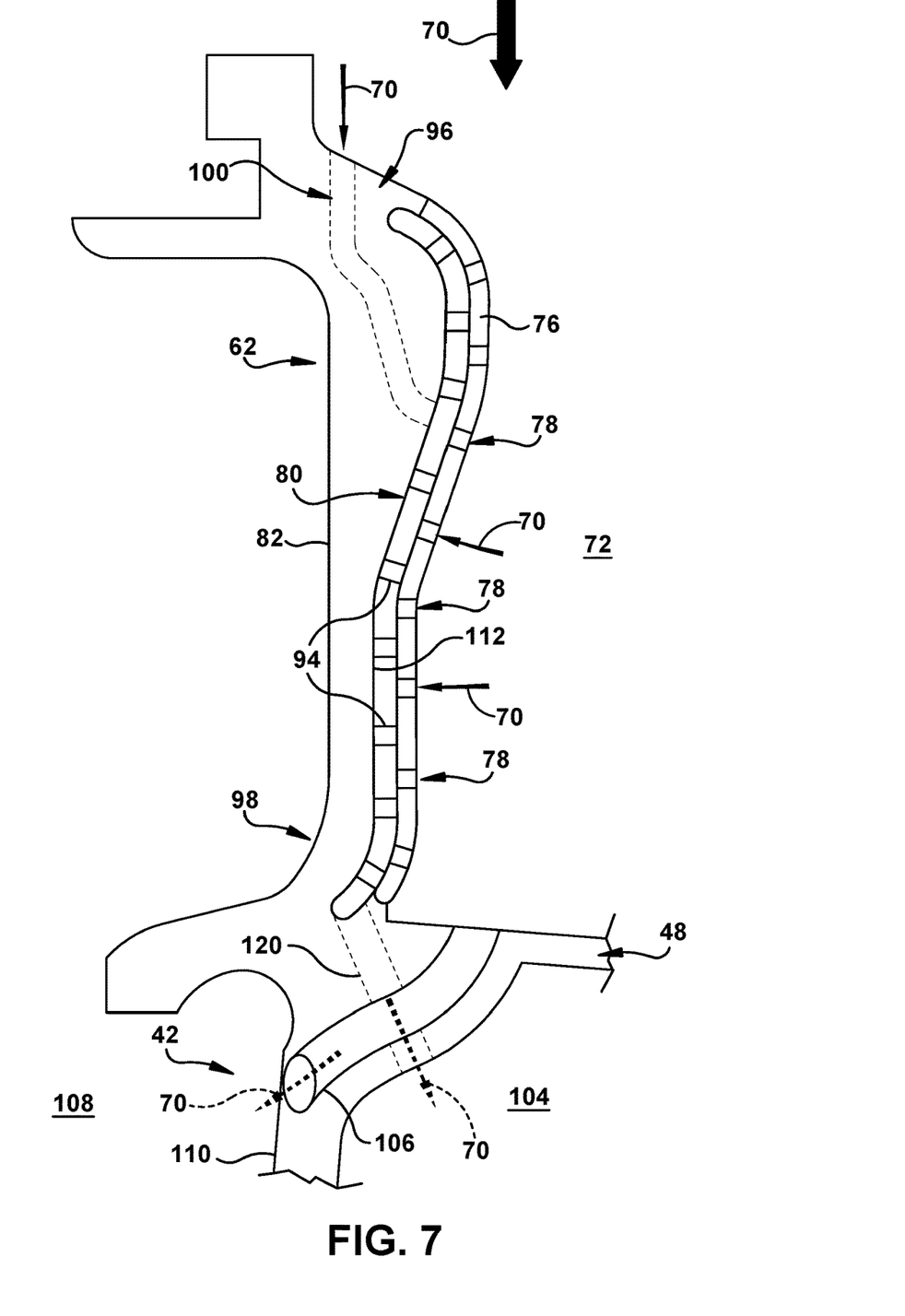
FIG. 7 depicts a cross-sectional view of a leading edge portion of a nozzle vane taken along line 7-7 in FIG. 4 according to embodiments.

FIG. 7 depicts a cross-sectional view of the leading edge 62 of the vane 52 taken along line 7-7 in FIG. 4. During operation, a radially outward section 96 of the leading edge wall 82 of the vane 52 may experience higher forces than a radially inward section 98 of the leading edge wall 82. To this extent, according to embodiments, the thickness of the leading edge wall 82 may be preferentially varied such that higher forces regions (e.g., the radially outward section 96) are thicker than lower force regions (the radially inward section 98).

In addition to any impingement cooling provided to the inner side wall 112 of the leading edge wall 82 of the vane 52 via the impingement plate 76, further cooling may be required at the thickened section 96 of the leading edge wall 82. Such cooling may be provided, for example, by forming a channel 100 through the thickened section 96 of the leading edge wall 82, extending from the internal cavity 72 to the cavity 80.

The channel 100 is fluidly coupled to the cavity 80, which is further fluidly coupled to a channel 102 formed through the inner side the wall 48 of the nozzle 32. After passing from the cavity 72 through the channel 100 and absorbing heat from the thickened section 96 of the leading edge wall 82, cooling air 70 passes out of the cavity 80 into an internal cavity 104 of the diaphragm 42 through the channel 102. The cooling air 70 entering the cavity 104 through the channel 102 may pressurize the cavity 104 (e.g., to prevent hot gasses from entering the cavity 104) and/or may provide cooling to the inner side wall 48 of the nozzle 32. Yet another channel 106 may be provided to fluidly couple the cavity 72 to the wheel space 108 of the turbine section 24 (FIG. 1). The channel 106 may extend from the cavity 72 to the wheel space 108, for example, through the inner side wall 48 of the nozzle 32 and a side wall 110 of the diaphragm 42. The cooling air 70 flowing through the channel 106 may provide cooling to the inner side wall 48 of the nozzle 32 and the side wall 110 of the diaphragm 42, and/or may be used to pressurize the wheel space 108 to keep hot gasses from entering the wheel space 108.

Figure 8:
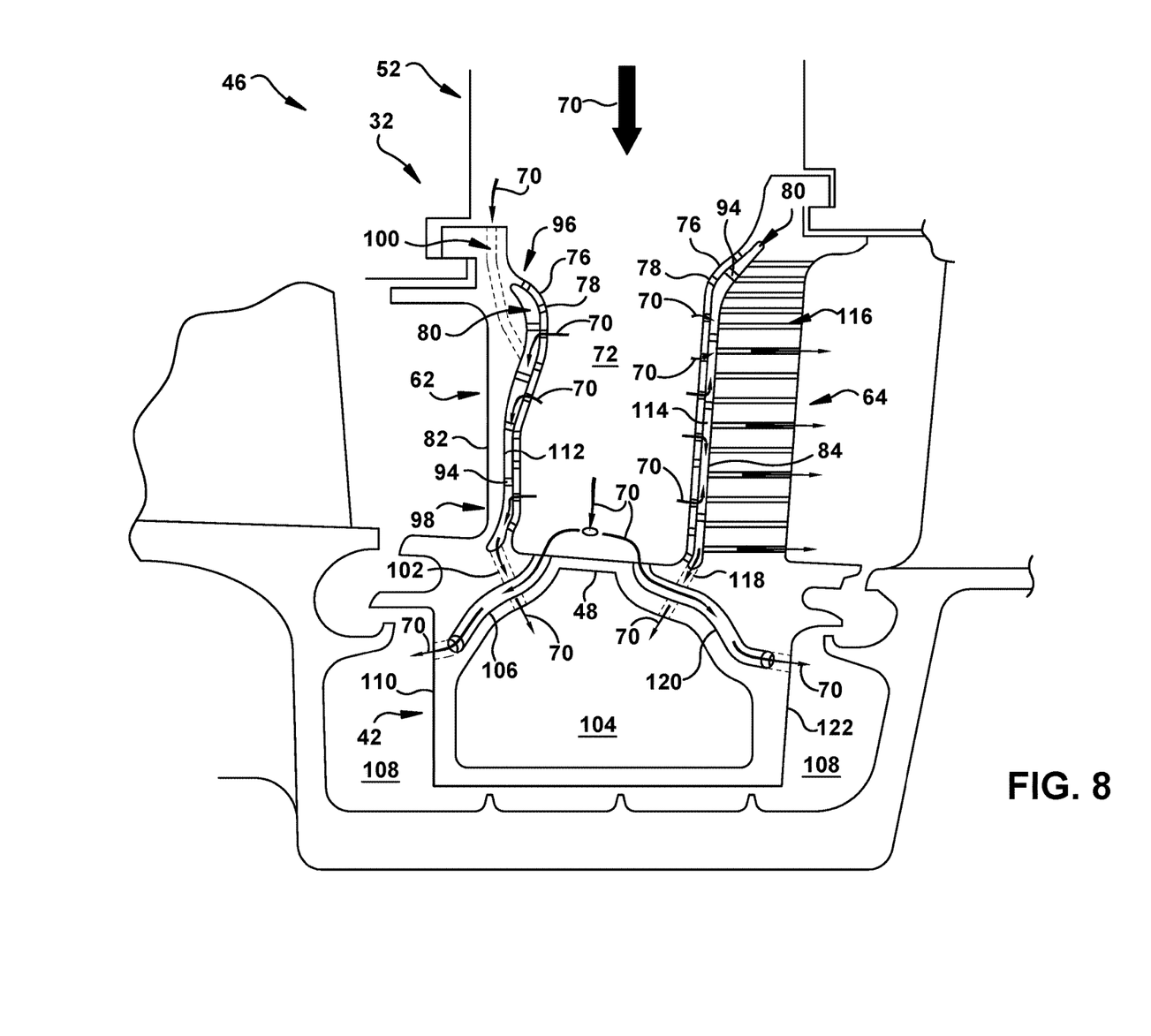
FIG. 8 depicts a cross-sectional view of a nozzle segment according to embodiments.

FIG. 8 depicts a cross-sectional view of the nozzle segment 46 taken from the leading edge 62 to the trailing edge 64 of a vane 52 according to embodiments. To this extent, FIG. 8 includes the features at the leading edge 62 of the vane 52 previously described above with regard to FIG. 7.

As shown in FIG. 8, the impingement plate 76 follows the contours of the inner side wall 114 of the trailing edge wall 84 of the trailing edge 64 of the vane 52. Cooling air 70 passes through the plurality of apertures 78 formed in the impingement plate 76 and into the cavity 80, where the cooling aft 70 impinges against the inner side wall 114 of the trailing edge wall 84, providing impingement cooling.

The cavity 80 may be fluidly coupled to at least one of a trailing edge cooling circuit 116 and a channel 118 formed through the inner side wall 48 of the nozzle 32. After impinging on the inner side wall 114 of the trailing edge wall 84, cooling air 70 may pass out of the cavity 80 into the internal cavity 104 of the diaphragm 42 through the channel 118 and/or may pass out of the cavity 80 to the trailing edge cooling circuit 116. The cooling air 70 entering the cavity 104 through the channel 118 combines with the cooling air 70 entering the cavity 104 through the channel 102 to pressurize the cavity 104 (e.g., to prevent hot gasses from entering the cavity 104) and/or provide cooling to the inner side wall 48 of the nozzle 32.

An additional channel 120 may be provided to fluidly couple the cavity 72 to the wheel space 108 of the turbine section 24 (FIG. 1). The channel 120 may extend from the cavity 72 to the wheel space 108, for example, through the inner side wall 48 of the nozzle 32 and a side wall 122 of the diaphragm 42. The cooling air 70 flowing through the channel 120 may provide cooling to the inner side wall 48 of the nozzle 32 and the side wall 122 of the diaphragm 42, and/or be used to pressurize the wheel space 108 to keep hot gasses from entering the wheel space 108.

The support beams 94 formed between the impingement plate 76 and the inner side walls 112, 114 of the leading and trailing edge walls 82, 84 provide structural support/stiffness for the leading and trailing edge walls 82, 84, which allows the leading and trailing edge walls 82, 84 of the vane 52 to be made thinner. Further, the support beams 94 maintain and control the separation between the impingement plate 76 and the inner side walls 112, 114 of the leading and trailing edge walls 82, 84.

Although described above with regard to turbine nozzle segment 46, some/all of the embodiments described herein may also be applied to other components of a gas turbine system 10. For example, some/all of the embodiments described herein may be applied to a turbine blade 34, shroud 44, or other component(s) of the turbine system 10.

Various components and features of the nozzle segment 46 of the present disclosure may be formed using an additive manufacturing process. Advantageously, additive manufacturing enables the design and production of more customizable features (e.g., vanes 52 with optimized wall thicknesses, contour-following impingement plate 76, etc.) as well as more intricate features (e.g., support beams 94), to provide better aerodynamic and high temperature efficiencies. Further, using additive manufacturing, the size (e.g., diameter, length) of various channels (e.g., channels 100, 102, 106, 118, 120) within the vanes 52 and diaphragm 42 of the nozzle segment 46 can be customized/optimized to reduce flow losses and to increase cooling efficiencies. In addition, features such as the contour-following impingement plate 76 and the support beams 94 may be formed integrally with the walls of the vane 52.

As detailed above, the operational lifetime of the nozzle 32 may be increased, for example, by preferentially varying the thicknesses of various portions (e.g., walls, impingement plate, etc.) of the vanes 52. A flow diagram of a process for optimizing wall thicknesses in a vane 52 is provided in FIG. 9.

Figure 9:
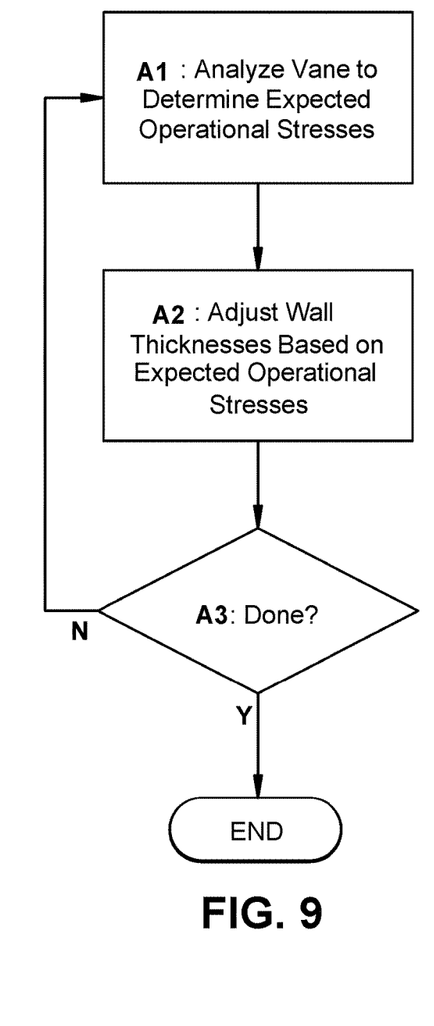
FIG. 9 depicts a flow diagram of a process for optimizing wall thicknesses in a nozzle vane according to embodiments.

At process A1, an analysis is performed to determine the expected operational forces on various portions (e.g., pressure side wall 66, suction side wall 68, leading edge wall 82, trailing edge wall 84, etc.) of a vane 52. The analysis may be performed, for example, on a design of the vane 52, a physical model of the vane 52, or on the vane 52 itself. At process A2, the design of the vane 52 is modified by preferentially varying the thicknesses of one or more walls of the vane 52 based on the expected operational forces. Processes A1 and A2 may be repeated as necessary on the updated design of the vane 52 (YES at process A3) to further optimize the wall thicknesses of the vane 52.

As used herein, additive manufacturing may include any process of producing an object through the successive layering of material rather than the removal of material, which is the case with conventional processes. Additive manufacturing can create complex geometries without the use of any sort of tools, molds or fixtures, and with little or no waste material. Instead of machining components from solid billets of plastic or metal, much of which is cut away and discarded, the only material used in additive manufacturing is what is required to shape the part. Additive manufacturing processes may include but are not limited to: 3D printing, rapid prototyping (RP), direct digital manufacturing (DDM), binder jetting, selective laser melting (SLM) and direct metal laser melting (DMLM). In the current setting, DMLM or SLM have been found advantageous.

Figure 10:
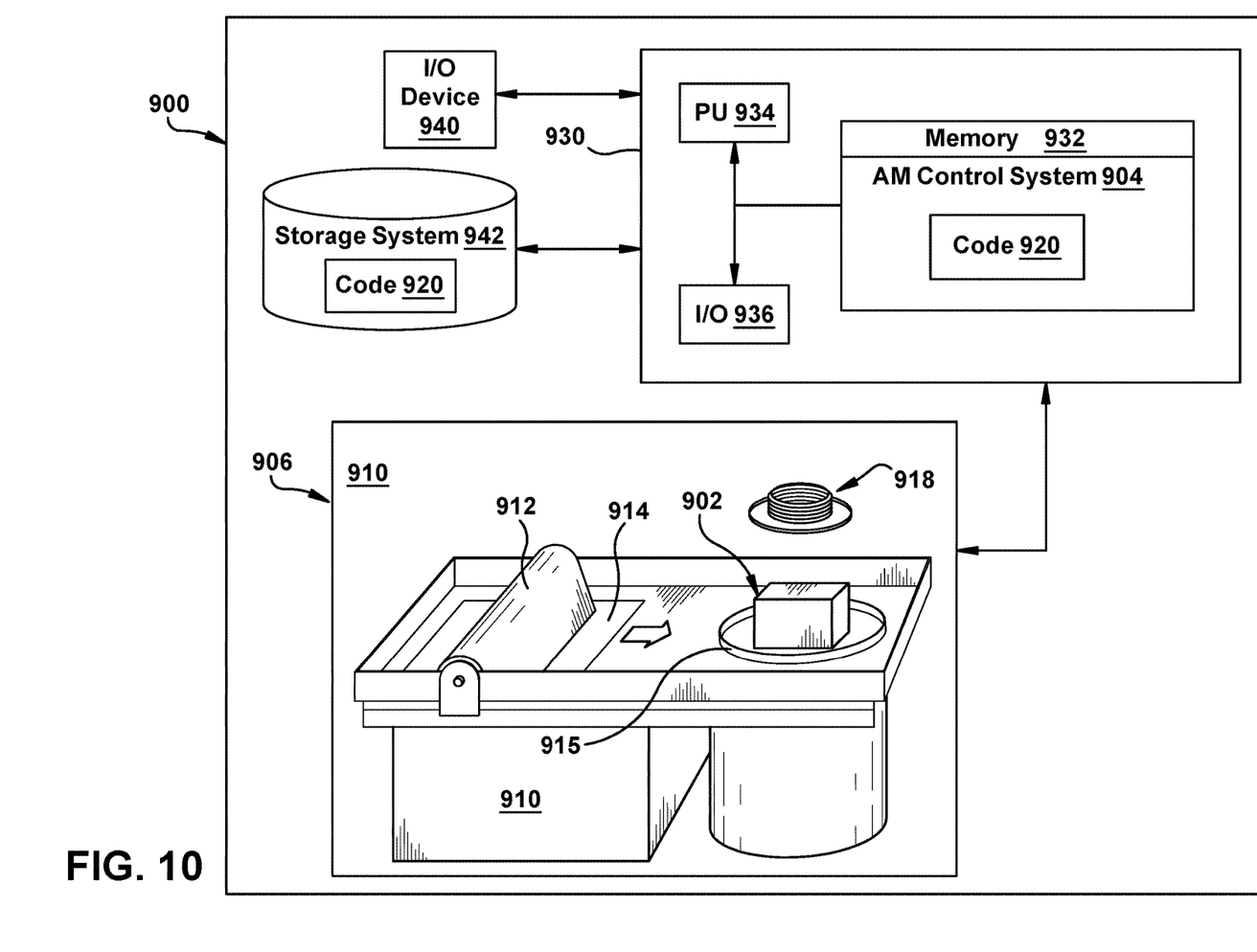
FIG. 10 depicts a block diagram of an additive manufacturing process including a non-transitory computer readable storage medium storing code representative of an object according to embodiments of the disclosure.

To illustrate an example of an additive manufacturing process, FIG. 10 shows a schematic/block view of an illustrative computerized additive manufacturing system 900 for generating an object 902. In this example, the system 900 is arranged for DMLM. It is understood that the general teachings of the disclosure are equally applicable to other forms of additive manufacturing. The object 902 is illustrated as a nozzle segment 46 (FIGS. 3-7). The AM system 900 generally includes a computerized additive manufacturing (AM) control system 904 and an AM printer 906. The AM system 900, as will be described, executes code 920 that includes a set of computer-executable instructions defining the object 902 to physically generate the object 902 using the AM printer 906. Each AM process may use different raw materials in the form of, for example, fine-grain powder, liquid (e.g., polymers), sheet, etc., a stock of which may be held in a chamber 910 of the AM printer 906. In the instant case, the nozzle segment 46 may be made of a metal or metal compound capable of withstanding the environment of a gas turbine system 10 (FIG. 1). As illustrated, an applicator 912 may create a thin layer of raw material 914 spread out as the blank canvas on a build plate 915 of AM printer 906 from which each successive slice of the final object will be created. In other cases, the applicator 912 may directly apply or print the next layer onto a previous layer as defined by code 920, e.g., where a metal binder jetting process is used. In the example shown, a laser or electron beam 916 fuses particles for each slice, as defined by code 920, but this may not be necessary where a quick setting liquid plastic/polymer is employed. Various parts of the AM printer 906 may move to accommodate the addition of each new layer, e.g., a build platform 918 may lower and/or chamber 910 and/or applicator 912 may rise after each layer.

The AM control system 904 is shown implemented on a computer 930 as computer program code. To this extent, the computer 930 is shown including a memory 932, a processor 934, an input/output (I/O) interface 936, and a bus 938. Further, the computer 930 is shown in communication with an external I/O device/resource 940 and a storage system 942. In general, the processor 934 executes computer program code, such as the AM control system 904, that is stored in memory 932 and/or storage system 942 under instructions from code 920 representative of the object 902, described herein. While executing computer program code, the processor 934 can read and/or write data to/from memory 932, storage system 942, I/O device 940, and/or AM printer 906. The bus 938 provides a communication link between each of the components in the computer 930, and the I/O device 940 can comprise any device that enables a user to interact with computer 940 (e.g., keyboard, pointing device, display, etc.). The computer 930 is only representative of various possible combinations of hardware and software. For example, the processor 934 may comprise a single processing unit, or be distributed across one or more processing units in one or more locations, e.g., on a client and server. Similarly, the memory 932 and/or storage system 942 may reside at one or more physical locations. The memory 932 and/or storage system 942 can comprise any combination of various types of non-transitory computer readable storage medium including magnetic media, optical media, random access memory (RAM), read only memory (ROM), etc. The computer 930 can comprise any type of computing device such as a network server, a desktop computer, a laptop, a handheld device, a mobile phone, a pager, a personal data assistant, etc.

Additive manufacturing processes begin with a non-transitory computer readable storage medium (e.g., memory 932, storage system 942, etc.) storing code 920 representative of the object 902. For example, the code 920 may include a precisely defined 3D model of the object 902 and can be generated from any of a large variety of well-known computer aided design (CAD) software systems such as AutoCAD®, TurboCAD®, DesignCAD 3D Max, etc. In this regard, the code 920 can take any now known or later developed file format. For example, the code 920 may be in the Standard Tessellation Language (STL) which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. The code 920 may be translated between different formats, converted into a set of data signals and transmitted, received as a set of data signals and converted to code, stored, etc., as necessary. The code 920 may be an input to system 900 and may come from a part designer, an intellectual property (IP) provider, a design company, the operator or owner of system 900, or from other sources. In any event, the AM control system 904 executes the code 920, dividing the object 902 into a series of thin slices that it assembles using the AM printer 906 in successive layers of liquid, powder, sheet or other material. In the DMLM example, each layer is melted to the exact geometry defined by the code 920 and fused to the preceding layer. Subsequently, the object 902 may be exposed to any variety of finishing processes, e.g., those described herein for re-contouring or other minor machining, sealing, polishing, etc.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A vane, comprising:
    an internal cavity configured to receive a flow of coaling fluid;
    a variable thickness wall adjacent the internal cavity;
    a variable thickness impingement plate separating the variable thickness wall from the internal cavity, the impingement plate including a plurality of apertures for directing the cooling fluid into an impingement cavity and against the variable thickness wall, wherein the impingement plate is configured to follow a contour of the variable thickness wall, and wherein the thickness of each section of the impingement plate is inversely proportional to a thickness of an adjacent section of the variable thickness wall; and
    a plurality of support beams extending between and physically connected to the impingement plate and the variable thickness wall,
    wherein the plurality of support beams are configured to maintain a constant separation distance between the impingement plate and the variable thickness wall and to provide structural support to the variable thickness wall.

2. The vane according to claim 1, wherein the vane comprises a vane of a nozzle in a gas turbine system.

3. The vane according to claim 1, wherein the variable thickness wall comprises one or more of a leading edge wall of the vane, a trailing edge wall of the vane, a pressure side wall of the vane, and a suction side wall of the vane.

4. The vane according to claim 1, wherein the thickness of the variable thickness wall varies in accordance with expected operational forces on the vane.

5. The vane according to claim 4, wherein the thickness of the variable thickness wall is 1.1 to 2.5 times a nominal wall thickness of the vane.

6. The vane according to claim 1, further including a cooling channel formed in a thickened portion of the vane, wherein the cooling channel is fluidly coupled to the internal cavity.

7. The vane according to claim 1, further including a channel for fluidly coupling the impingement cavity to at least one of an internal cavity of a diaphragm and a trailing edge cooling circuit of the vane.

8. The vane according to claim 7, wherein the vane is formed integrally with the diaphragm.

9. The vane according to claim 1, further including at least one channel for fluidly coupling the internal cavity to a wheel space of a gas turbine system.

10. A nozzle segment for a gas turbine system, comprising:
   an integrated nozzle and diaphragm, the nozzle including at least one vane, each vane including:
      an internal cavity configured to receive a flow of cooling fluid;
      a variable thickness wall adjacent the internal cavity;
      a variable thickness impingement plate separating the variable thickness wall from the internal cavity, the impingement plate including a plurality of apertures for directing the cooling fluid into an impingement cavity and against the variable thickness wall, wherein the impingement plate is configured to follow a contour of the variable thickness wall, and wherein the thickness of each section of the impingement plate is inversely proportional to a thickness of an adjacent section of the variable thickness wall; and
      a plurality of support beams extending between and physically connected to the impingement plate and the variable thickness wall, wherein the plurality of support beams are configured to maintain a constant separation distance between the impingement plate and the variable thickness wall and to provide structural support to the variable thickness wall, and wherein the thickness of the variable thickness wall varies in accordance with expected operational forces on the vane.

11. The nozzle segment according to claim 10, wherein the variable thickness wall comprises one or more of a leading edge wall of the vane, a trailing edge wall of the vane, a pressure side wall of the vane, and a suction side wall of the vane.

12. The nozzle segment according to claim 10, wherein the thickness of the variable thickness wall is 1.1 to 2.5 times a nominal wall thickness of the vane.

13. The nozzle segment according to claim 10, further including a cooling channel formed in a thickened portion of the vane, wherein the cooling channel is fluidly coupled to the internal cavity.

14. The nozzle segment according to claim 10, further including a channel for fluidly coupling the impingement cavity to at least one of an internal cavity of the diaphragm and a trailing edge cooling circuit of the vane.

15. The nozzle segment according to claim 10, further comprising at least one channel for fluidly coupling the internal cavity of the vane to a wheel space of the gas turbine system.

\* \* \* \* \*